United States Patent [19]

Maximov et al.

[11] 3,808,461

[45] Apr. 30, 1974

[54] DEVICE FOR DIFFERENTIATING AND INTEGRATING ELECTRICAL VOLTAGES

[76] Inventors: Alexandr Stepanovich Maximov, ul. Smirnovskaya 1-a, kv. 18, Ljubertsy; Zinjur Abbyasov, Mozhaiskoe shosse, 76, kv. 86, Moscow, both of U.S.S.R.

[22] Filed: Nov. 2, 1967

[21] Appl. No.: 680,066

[52] U.S. Cl. .................. 307/229, 307/317, 328/128, 328/142

[51] Int. Cl. .................. G06g 7/18

[58] Field of Search .......... 307/229, 261, 295, 317; 328/127, 128, 142

[56] References Cited

UNITED STATES PATENTS 3,289,107 11/1966 Zellmer et al. ................. 307/237 X

*Primary Examiner*—John Zazworsky
*Attorney, Agent, or Firm*—Waters, Roditi, Schwartz & Nissen

[57] ABSTRACT

An apparatus for differentiating or integrating electrical voltages includes an amplifier in the form of either a pentode, a semiconductor triode, or a transistor, each of which amplifiers includes an input electrode, an output electrode, and a control plate. For the purpose of differentiation, an input circuit is coupled with the control plate, and an output circuit and a diode are each coupled with the output electrode. On the other hand, for the purpose of integration, the output circuit, in which is connected a diode, is coupled with the input electrode. A source of a.c. current is coupled with the input circuit a load and the output circuit.

12 Claims, 6 Drawing Figures

DEVICE FOR DIFFERENTIATING AND INTEGRATING ELECTRICAL VOLTAGES

The invention relates to devices for differentiating and integrating electrical voltages which can be used, for example, in the automatic control systems, in the circuits of forming and processing pulse signals.

There are known devices for differentiating electrical voltages consisting of an induction coil connected to the output circuit of an active amplifying element, for example, to a pentode plate circuit or a collector circuit of the semiconductor triode ("Radio Engineering Manual" edited by Smirenina B.A.,1950, page 408).

There are known devices for integrating electrical voltages consisting of an induction coil and a resistor connected in series (L.M. Goldenberg "Fundamentals of Pulse Nature," Moscow, Pages 54–56).

The disadvantage of the known differentiation devices is that during differentiation of slowly varying signals having a frequency spectrum ranging from zero up to hundreds of cycles per second, coils of high inductance are to be employed to obtain required sensitivity; the said coils have large dimensions and can not be manufactured in accordance with an integral microcircuit flowsheet. It is difficult to obtain higher integrating time in the said integrators since coils of higher inductance as well are required.

The principal object of the invention is to develop a device for differentiating and integrating electrical voltages which in comparison with the known ones will have substantially smaller dimensions.

Another object of the present invention is to develop a device which will be manufactured in accordance with the integral microcircuit flow sheet.

The aforesaid and other objects are achieved in a device for differentiating and integrating electrical voltages which employs an active amplifying element with an inductance element connected in the output circuit wherein, according to the invention, a diode is used as the inductance element, the reverse current increasing in time approximately in accordance with the exponential law.

For the purpose of differentiation it is expedient to connect the diode with a rising reverse current, in the anode circuit, while for the purpose of integration, the diode is connected to the cathode circuit of a pentode constituted as an active amplifying element.

For the purpose of differentiation the diode with a rising reverse current may be connected in the collector circuit, while for the purpose of integration the diode is connected to the emitter circuit of a the triode constituted as an active amplifying element.

For the purpose of differentiation the diode with a rising reverse current may be connected to the output circuit, while for the purpose of integration the diode is connected to the source circuit of a field effect transistor constituted as an active amplifying element.

The diode with a rising reverse current may be of a semiconductor type, the *p* - *n* junction of which has an inversive layer.

The diode with a rising reverse current may be made as film diode, the film structure of which is provided with charge carrier traps.

Hereinbelow the invention is made clear from the description of its embodiment and the drawings attached hereto wherein.

Figure 1:
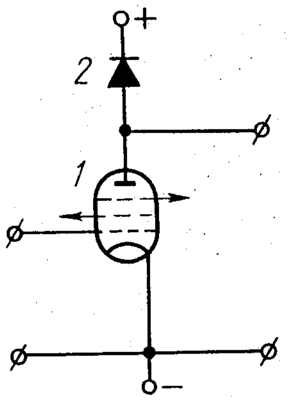
FIGS. 1 and 2 illustrate devices for differentiating and integrating electrical voltages, according to the invention.

An electrical voltage differentiator consists of a vacuum pentode 1 (FIG. 1) to the anode circuit of which is connected either a back bias semiconductor diode 2 with a *p* - *n* junction, or a film diode consisting of metallic and semiconductor or dielectrical films.

Moreover, the surface of the *p* - *n* junction may be provided with a layer of inversive conductivity relative to the volume of the semiconductor.

Slow passage of current through the film diodes as the boosting voltage is supplied thereto depends on charge carriers in the film structure of the traps, i.e., slow and rapid trap levels.

Equivalent inductance of the said diodes can reach approximately $10_H^6$.

Figure 2:
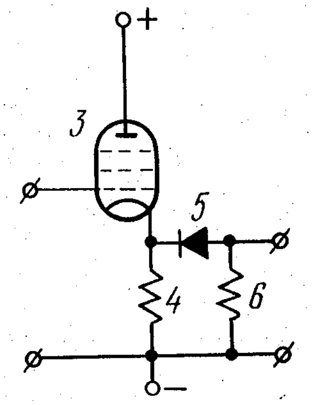

The electrical voltage integrator consists of a pentode 3 (FIG. 2), to the cathode circuit of which is connected a resistor 4 which is an input resistance of an integrating circuit comprising a back bias diode 5, which can be either a semiconductor with a *p* - *n* junction having an inversive layer, or a film diode, and output resistor 6.

The diode 5 has a fixed bias due to the current present in the cathode circuit while the value of the said fixed bias is set by selection of a value of the resistor 4.

Figure 3:
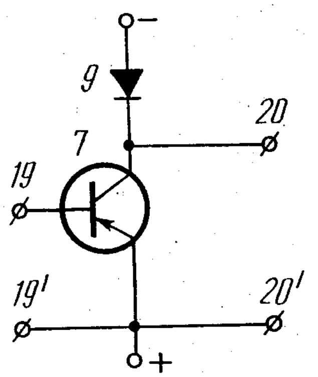
FIGS. 3 and 4 illustrate another embodiment of the devices for differentiating and integrating electrical voltages, according to the invention.
Figure 4:
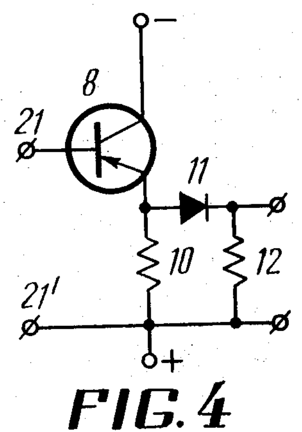

FIGS. 3 and 4 illustrate another embodiment of the electrical voltage differeniator and integrator respectively wherein semiconductor triode 7 (FIG. 3) and (FIG. 4) is constituted as an amplifying element.

In the differentiator (FIG. 3) the diode 9 is connected to the collector circuit.

In the integrator, (FIG. 4) there is connected to the emitter circuit of the semiconductor triode 8 a resistor 10 which serves as input resistance of the integrating circuit consisting of a back bias diode 11 and an output resistance 12.

The fixed bias across the diode 11 is determined by a value of the resistor 10.

Figure 5:
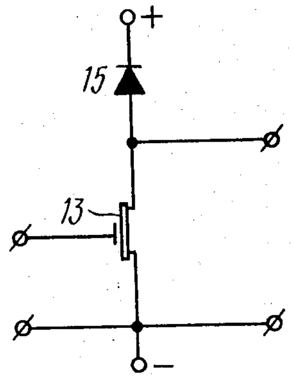
FIGS. 5 and 6 illustrate still another embodiment of the devices for differentiating and integrating electrical voltages, according to the invention.
Figure 6:
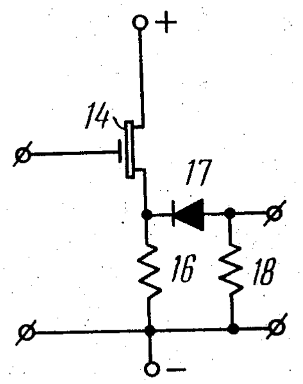

FIGS. 5 and 6 illustrate a third embodiment of the differentiator and the integrator respectively wherein employed as amplifying elements are field effect transistors 13 and 14.

In the differentiator, the diode 15 is connected to the output circuit, while in the integrator, there is connected to the source or input circuit of the transistor 14 a resistor 16 which serves as an input resistance of the integrating circuit consisting of a back bias diode 17 and an output resistor 18.

The fixed bias across the diode 17 is determined by the value of the resistor 16.

The device for differentiating and integrating electrical voltages operates as follows.

Applied to the input 19, 19′, input 19 being connected to the base of the semiconductor triode 7, is an alternating voltage which is to be differentiated.

The said voltage is amplified by the semiconductor triode 7. In the collector circuit current proportional to the differential of the input voltage passes through diode 9.

Consequently the output voltage picked up from the commutator 20,20' will be proportional to the differential of the input voltage.

The differentiator circuits employing in one case a pentode and in the other case a field effect transistor.

The device for integrating operates as follows.

Applied to the input 21,21' (input 21 connected to the base of the semiconductor triode 8) is an alternating voltage which is to be integrated. The said voltage is discriminated from the emitter load and is delivered to the input of the integrating circuit consisting of diode 11 and resistor 12. The alternating current proportional to the integral of the input voltage passes through the said circuit. Consequently, the output voltage picked up from the resistor 12 will be proportional to the integral of the input voltage.

The integrator circuits employing a pentode in one case and a field effect transistor in the other case, operate in a similar way.

The device is designed for differentiating and integrating electrical voltages. It provides for differentiating or integrating a voltage slowly varying in time and may be manufactured both by use of semiconductor and thin-layer technology.

The dimensions of the device are confined to minimum possible dimensions obtainable by the respective manufacturing process and, at present, do not exceed $10^{-3}cm^3$ with the housing and power supply unit removed.

The device is operable with signals having a frequency spectrum ranging from $10^{-3}$ up to $10^3$ c/s.

What we claim is:

1. Apparatus for differentiating electrical voltages comprising amplifying means including an input and an output, circuit means including a diode connected to the output of the amplifying means as a load for passing current in only a single preferred direction in said circuit means, said diode being a semiconductor including a p - n junction which is provided with an inversive layer and exhibiting an exponential increase in reverse current with respect to a time base and an a.c. source connected to said input.

2. Apparatus as claimed in claim 1, wherein said amplifying means is a pentode.

3. Apparatus as claimed in claim 1, wherein said amplifying means is a semiconductor triode.

4. Apparatus as claimed in claim 1, wherein said amplifying means is a transistor.

5. Apparatus for integrating electrical voltages comprising amplifying means including an input and an output, circuit means including a diode connected to the output of the amplifying means as a load for passing current in only a single preferred direction in said circuit means, said diode being a semiconductor including a *p-n* junction which is provided with an inversive layer and exhibiting an exponential increase in reverse current with respect to a time base and an a.c. source connected to said input.

6. Apparatus as claimed in claim 5, including a first resisting element connected in parallel to said input.

7. Apparatus as claimed in claim 5, including a second resisting element connected in parallel with said diode.

8. Apparatus as claimed in claim 5, wherein said amplifying means is a pentode.

9. Apparatus as claimed in claim 5, wherein said amplifying means is a semiconductor triode.

10. Apparatus as claimed in claim 5, wherein said amplifying means is a transistor.

11. Apparatus for integrating electrical voltages comprising amplifying means including an input and an output, circuit means including a diode connected to the output of the amplifying means as a load for passing current in only a single preferred direction in said circuit means, said diode being a film diode, the film of which includes charge carrier traps, said diode exhibiting an exponential increase in reverse current with respect to a time base and an a.c. source connected to said input.

12. Apparatus for differentiating electrical voltages comprising amplifying means including an input and an output, circuit means including a diode connected to the output of the amplifying means as a load for passing current in only a single preferred direction in said circuit means, said diode being a film diode, the film of which includes charge carrier traps, said diode exhibiting an exponential increase in reverse current with respect to a time base and an a.c. source connected to said input.

* * * * *